United States Patent
Huang et al.

(10) Patent No.: US 8,966,410 B2
(45) Date of Patent: Feb. 24, 2015

(54) SEMICONDUCTOR STRUCTURE AND METHOD FOR FABRICATING SEMICONDUCTOR LAYOUT

(71) Applicant: United Microelectronics Corp., Hsin-Chu (TW)

(72) Inventors: Chia-Wei Huang, Tainan (TW); Ming-Jui Chen, Tainan (TW); Chun-Hsien Huang, Tainan (TW)

(73) Assignee: United Microelectronics Corp., Science-Based Industrial Park, Hsin-Chu (TW)

( * ) Notice: Subject to any disclaimer, the term of this patent is extended or adjusted under 35 U.S.C. 154(b) by 0 days.

(21) Appl. No.: 14/065,443

(22) Filed: Oct. 29, 2013

(65) Prior Publication Data

US 2014/0045105 A1    Feb. 13, 2014

Related U.S. Application Data

(62) Division of application No. 13/164,757, filed on Jun. 20, 2011, now Pat. No. 8,598,712.

(51) Int. Cl.

| | |
|---|---|
| *G06F 17/50* | (2006.01) |
| *G06F 19/00* | (2011.01) |
| *G03F 1/00* | (2012.01) |
| *G21K 5/00* | (2006.01) |
| *G03F 1/76* | (2012.01) |
| *H01L 21/311* | (2006.01) |
| *G03F 1/70* | (2012.01) |

(Continued)

(52) U.S. Cl.
CPC .............. *G03F 1/76* (2013.01); *G06F 2217/12* (2013.01); *G21K 5/00* (2013.01); *G06F 19/00* (2013.01); *G06F 17/5081* (2013.01); *G06F 17/5068* (2013.01); *H01L 21/31144* (2013.01); *G03F 1/70* (2013.01); *H01L 23/5226* (2013.01); *H01L 23/528* (2013.01); *H01L 21/76811* (2013.01); *H01L 21/76816* (2013.01)
USPC ........ 716/54; 716/55; 716/51; 430/5; 378/35; 700/97; 700/120; 700/121

(58) Field of Classification Search
CPC . G06F 17/5081; G06F 2217/12; G06F 19/00; G21K 5/00; G03F 1/00
USPC ............. 716/54, 55, 51; 430/4, 5; 378/34, 35; 700/97.12, 121
See application file for complete search history.

(56) References Cited

U.S. PATENT DOCUMENTS

| | | | |
|---|---|---|---|
| 5,994,009 A | 11/1999 | Tzu | |
| 6,189,135 B1 * | 2/2001 | Chisaka | ........................ 716/55 |

(Continued)

OTHER PUBLICATIONS

Vincent Wiaux et al., "Split and Design Guidelines for Double Patterning", IMEC, 2007, pp. 1-11.

*Primary Examiner* — Phallaka Kik
(74) *Attorney, Agent, or Firm* — Winston Hsu; Scott Margo (57) ABSTRACT

A method for fabricating a semiconductor layout includes providing a first layout having a plurality of line patterns and a second layout having a plurality of connection patterns, defining at least a first to-be-split pattern overlapping with the connection pattern among the line patterns, splitting the first to-be-split pattern at where the first to-be-split pattern overlapping with the connection pattern, decomposing the first layout to form a third layout and a fourth layout, and outputting the third layout and the further layout to a first mask and a second mask respectively.

31 Claims, 8 Drawing Sheets

(51) Int. Cl.
*H01L 23/522* (2006.01)
*H01L 23/528* (2006.01)
*H01L 21/768* (2006.01)

(56) References Cited

U.S. PATENT DOCUMENTS

| | | | |
|---|---|---|---|
| 6,763,508 B2 * | 7/2004 | Igarashi et al. | 716/119 |
| 6,982,135 B2 * | 1/2006 | Chang et al. | 430/5 |
| 7,013,444 B2 * | 3/2006 | Igarashi et al. | 438/622 |
| 7,247,887 B2 | 7/2007 | King | |
| 7,315,641 B1 * | 1/2008 | Yoshikawa et al. | 382/144 |
| 7,784,019 B1 | 8/2010 | Zach | |
| 7,930,656 B2 | 4/2011 | Aton | |
| 8,151,222 B2 * | 4/2012 | Kim | 716/54 |
| 8,429,587 B2 * | 4/2013 | Kim | 716/124 |
| 2004/0191643 A1 * | 9/2004 | Chang et al. | 430/5 |
| 2004/0199892 A1 * | 10/2004 | Igarashi et al. | 716/12 |
| 2007/0020565 A1 | 1/2007 | Koh et al. | |
| 2007/0105387 A1 | 5/2007 | Blatchford | |
| 2007/0158756 A1 | 7/2007 | Dreeskornfeld | |
| 2008/0193859 A1 | 8/2008 | Hamouda | |
| 2008/0248429 A1 | 10/2008 | Chou | |
| 2009/0125865 A1 | 5/2009 | Aton | |
| 2009/0144691 A1 | 6/2009 | Rathsack | |
| 2009/0233238 A1 | 9/2009 | Hsu | |
| 2009/0258500 A1 | 10/2009 | Yang et al. | |
| 2010/0017779 A1 * | 1/2010 | Kim | 716/21 |
| 2011/0271238 A1 | 11/2011 | Mansfield | |
| 2012/0167018 A1 * | 6/2012 | Kim | 716/50 |

\* cited by examiner

SEMICONDUCTOR STRUCTURE AND METHOD FOR FABRICATING SEMICONDUCTOR LAYOUT

CROSS REFERENCE TO RELATED APPLICATIONS

This application is a division of U.S. application Ser. No. 13/164,757 filed on Jun. 20, 2011, and all benefits of such earlier application are hereby claimed for this division application.

BACKGROUND OF THE INVENTION

1. Field of the Invention

The present invention relates generally to a semiconductor structure and a method for fabricating a semiconductor layout, more particularly, to a semiconductor structure and a method for fabricating a semiconductor layout adopting double patterning technique (DPT).

2. Description of the Prior Art

Integrated circuit (IC) is constructed by devices and interconnections, which are formed by patterned feature indifferent layers. In the fabrication of IC, photolithography has been an essential technique. The photolithography is to form designed patterns such as implantation patterns or layout patterns on at least a photomask, and then to precisely transfer such patterns to a photoresist layer by exposure and development steps. Subsequently, by performing semiconductor processes such as ion implantation, etching process, or deposition, the complicated and sophisticated IC structure is obtained.

Figure 1:
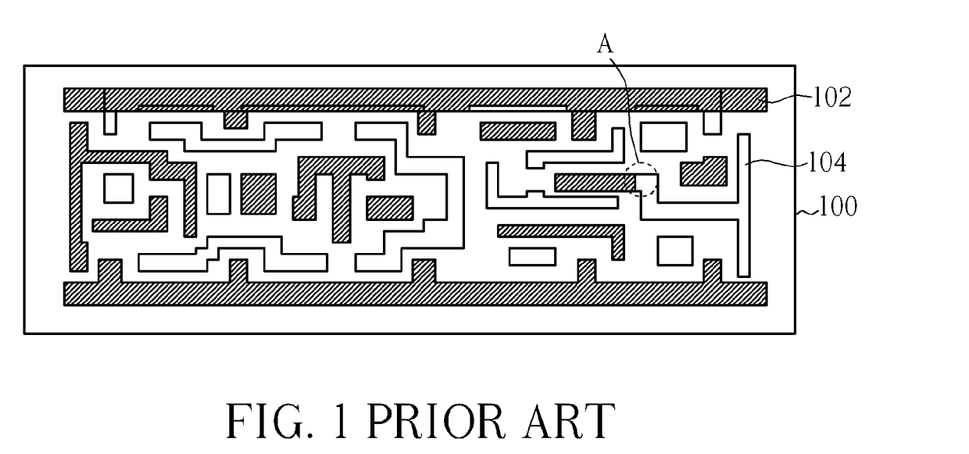
FIG. 1 is a schematic drawing illustrating a conventional double patterning technique.

Along with miniaturization of semiconductor devices and progress in fabrication of semiconductor device, conventional lithography process meets the bottleneck due to printability and manufacturability. To meet the requirements of device design rules which continue to push the resolution limits of existing processes and tooling, double patterning technique (DPT) is developed and taken as one of the most promising lithography technologies for 32 nanometer (nm) node and 22 nm node patterning since it can increase the half-pitch resolution by up to two times using current infrastructures. Please refer to FIG. 1, which is a schematic drawing illustrating a conventional DPT. As shown in FIG. 1, the DPT decomposes original layout patterns 100 into two masks and applies double exposure patterning to increase the pitch size and thus printability. In detail, one of the masks includes layout patterns 102 and the other includes layout patterns 104, and the layout patterns 102 and the layout patterns 104 compose the original layout patterns 100. When an intact configuration among the original layout patterns 100 has to be split to form the layout pattern 102 and the layout pattern 104 in consideration of the minimum space, which is emphasized by circle A in FIG. 1, such original layout pattern is taken as a to-be-split pattern.

Figure 2:
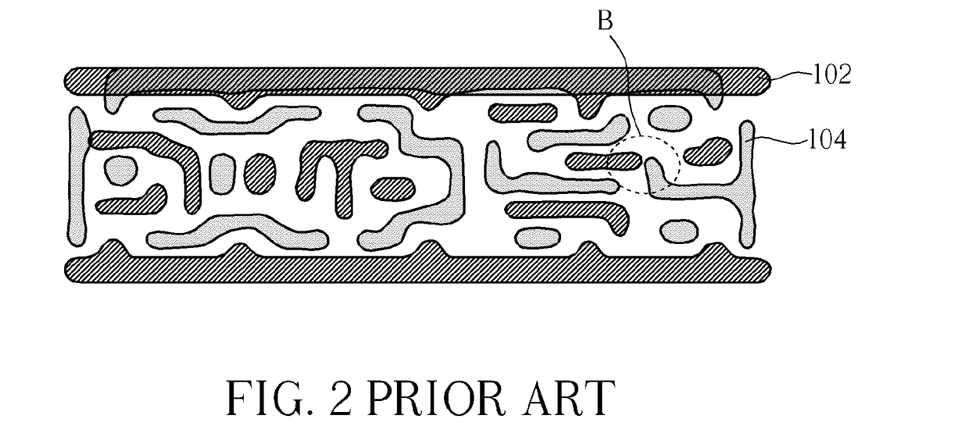
FIG. 2 is a semiconductor structure formed by the conventional DPT.

Please refer to FIG. 2, which is a semiconductor structure formed by the conventional DPT. Since the DPT undergoes multiple exposures, overlay control and alignment are always the major concern of the DPT. It is found that overlay control and accurate alignment are more important to the to-be-split pattern. When overlay error or inaccurate alignment occurs, two split patterns obtained by splitting the to-be-split pattern, which should be connected after the DPT, may not be connected to each other. Furthermore, line-end shortening, which is often found in photolithography process, may cause split pattern break as shown in circle B in FIG. 2. Consequently, serious line broken is resulted. Briefly speaking, the to-be-split pattern increases manufacturing cost and complexity due to the overlay control and the line-end shortening issues.

Accordingly, it is still in need to overcome the abovementioned problems and provide a semiconductor structure and a method for fabricating a semiconductor layout.

SUMMARY OF THE INVENTION

According to a first aspect of the present invention, there is provided a semiconductor structure. The semiconductor structure includes a line pattern comprising at least a first line and a second line, and at least a portion of the first line and a portion of the second line being connected to each other in a connection region; and a connection pattern positioned in the connection region for electrically connecting the first line and the second line.

According to a second aspect of the present invention, there is provided a method for fabricating a semiconductor layout. The method includes providing a first layout comprising a plurality of line patterns; providing a second layout comprising a plurality of connection patterns; defining at least a first to-be-split pattern among the line patterns of the first layout, the first to-be-split pattern being overlapped with the connection pattern; and splitting the first to-be-split pattern at where the first to-be-split pattern overlapped with the connection pattern to decompose the first layout into a third layout and a fourth layout; and outputting the third layout and the fourth layout to a first mask and a second mask respectively.

According to a third aspect of the present invention, there is provided a method for fabricating a semiconductor layout. The method includes providing a first layout comprising a plurality of line patterns; defining a plurality of to-be-split patterns among the line patterns; providing a second layout comprising a plurality of first connection patterns; inserting a plurality of second connection patterns respectively overlapping with the to-be-split patterns into the second layout; and outputting the second layout to a mask.

According to a fourth aspect of the present invention, there is provided a method for fabricating a semiconductor layout. The method includes providing a first original layout having a plurality of line patterns and a second original layout having a plurality of connection patterns; defining a plurality of to-be-split patterns being overlapped with the connection patterns in the first original layout; decomposing the first original layout to a first decomposed layout and a second decomposed layout respectively having the line patterns and the to-be-split patterns; forming the first decomposed layout and the second decomposed layout on a first mask and a second mask respectively; and performing a double patterning technique to sequentially transfer the first decomposed layout and the second decomposed layout into a layer to form the line patterns and the to-be-split patterns in the layer.

According to the method for fabricating a semiconductor layout provided by the present invention, the first original layout having the line patterns and the second original layout the connection patterns are provided. Then, the line patterns overlapped with the connection patterns are defined as the to-be-split patterns. Or, another connection patterns corresponding to the to-be-split patterns are provided in the second original layout or other layout. Accordingly, any to-be-split pattern of the first original layout obtains a corresponding connection pattern. Therefore, after decomposing the first original layout to the first decomposed layout and the second decomposed layout and transferring the first decomposed layout and the second decomposed layout to a layer by the DPT, a connection pattern is always subsequently formed corresponding to the to-be-split pattern, particularly at where the to-be-split pattern is split. Consequently, line broken issue is eliminated by forming the connection patterns corresponding to the to-be-split patterns even overlay error or line-end shortening defect occur and thus reliability of the formed semiconductor structure is improved. Briefly speaking, the present invention provides a method for fabricating a semiconductor layout that is able to solve the line broken problem in the DPT without increasing process complexity.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 3 and FIGS. 6-12 are schematic drawings illustrating a method for fabricating a semiconductor layout provided by a second preferred embodiment of the present invention.

DETAILED DESCRIPTION

Figure 3:
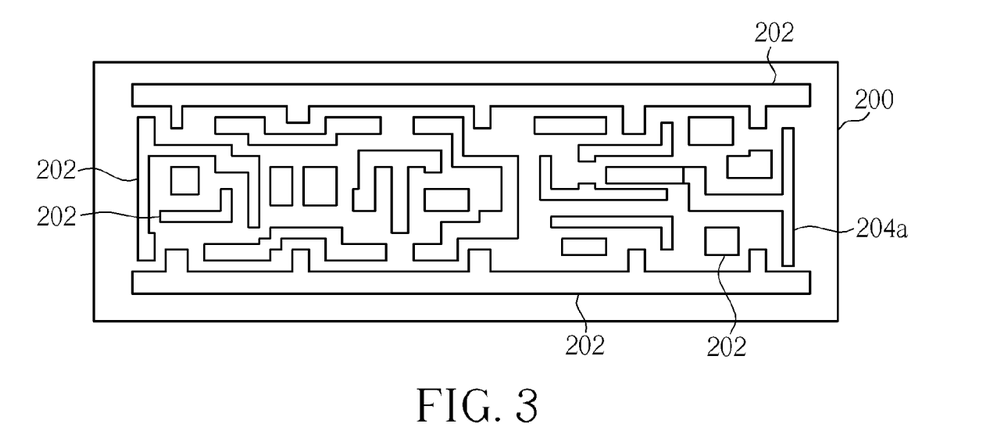
FIGS. 3-11 are schematic drawings illustrating a method for fabricating a semiconductor layout provided by a first preferred embodiment of the present invention.

Please refer to FIGS. 3-11, which are schematic drawings illustrating a method for fabricating a semiconductor layout provided by a first preferred embodiment of the present invention. As shown in FIG. 3, a first original layout 200 is provided. In the preferred embodiment, the first original layout 200 includes a trench layout of metal interconnections. The first original layout 200 includes a plurality of line patterns 202 such as trench patterns, but not limited to this. The line patterns 202 in the preferred embodiment can also include the polysilicon line patterns.

It is noteworthy that when a spacing width between a line pattern 202 and its adjacent at least two line patterns 202 violates a predetermined rule, such as a minimum design rule, the three line patterns 202 are designated to be decomposed to two different masks. However, if the violation is still not eliminated even the three line patterns 202 are decomposed to two masks, the preferred embodiment is to specifically define one of those line patterns 202 as a to-be-split pattern 204a among the line patterns 202 in the first original layout 200 according to the preferred embodiment. In other words, at least a to-be-split pattern 204a is defined among the line patterns 202 of the first original layout 200, and spacing widths between the to-be-split pattern 204a and other line patterns 202 violate the abovementioned predetermined rule.

Figure 4:
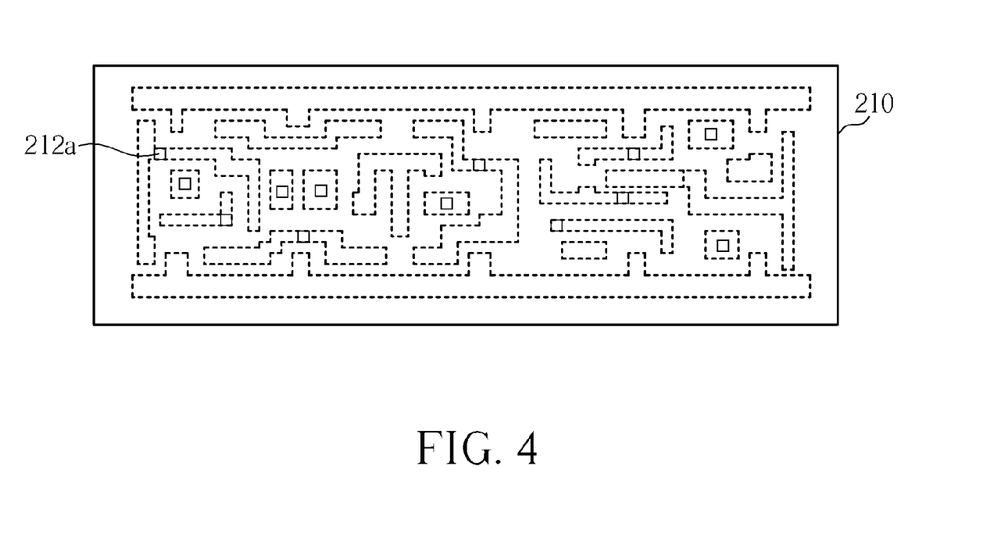

Please refer to FIG. 4. Next, a second original layout 210 is provided. The second original layout 210 includes a plurality of connection patterns 212a. According to the preferred embodiment, the second original layout 210 can be a via layout of metal interconnections, a dummy via layout, or a contact layout, but not limited to this. The second original layout 210 is to be transferred to a layer stacked on or under a layer to which the first original layout 200 is transferred. It is noteworthy that the first original layout 200 is shown by the dashed lines in FIG. 4 for emphasizing the spatial relationship between the first original layout 200 and the second original layout 210. However, those skilled in the art would easily realize the second original layout 210 includes only the connection patterns 212a that are shown by the solid lines.

Figure 5:
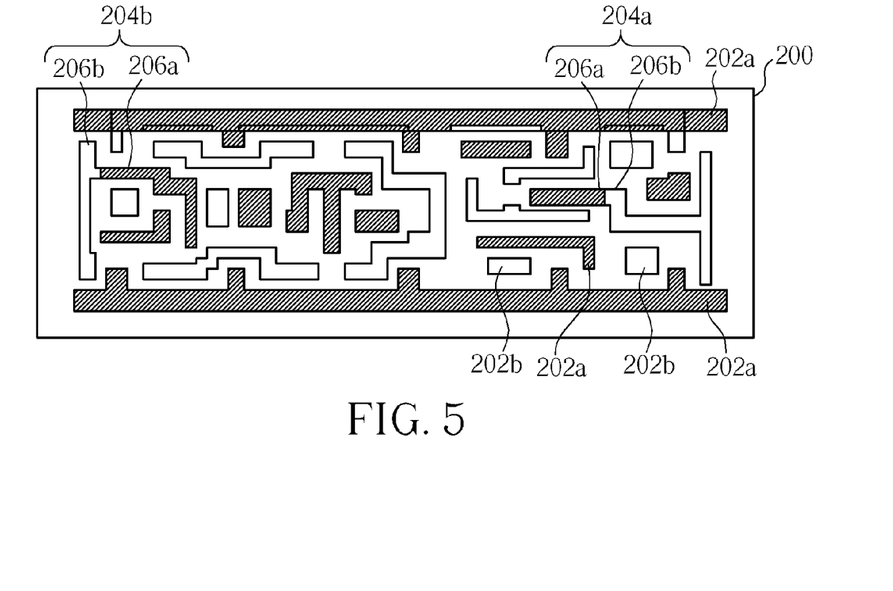

Please refer to FIG. 5. Next, the first original layout 200 and the second original layout 210 are compared and the first original layout 200 is simultaneously decomposed. In detail, when spacing widths between two adjacent line patterns 202 of the first original layout 200 violate the abovementioned predetermined rule, the adjacent line patterns are respectively defined to be a plurality of first line patterns 202a and a plurality of second line patterns 202b such that the spacing widths between each first line patterns 202a fulfill the predetermined rule and the spacing widths between each second line patterns 202b fulfill the predetermined rule, too. Since the preferred embodiment adopts the DPT, the first line patterns 202a and the second line patterns 202b are to be formed on different masks: One of the masks includes the first line patterns 202a, and the other includes the second line patterns 202b. More important, the to-be-split pattern 204a is split to a cutting portion 206a and a counterpart cutting portion 206b. The cutting portion 206a and the first line patterns 202a are formed in the same mask while the counterpart cutting portion 206b and the second line patterns 202b are formed in the same mask.

It is noteworthy that in accordance with the preferred embodiment, the first original layout 200 and the second original layout 210 are compared, and when a line pattern 202 of the first original layout 200 is overlapped with a connection pattern 212a of the second original layout 210, that line pattern is specifically defined as a to-be-split pattern 204b. In other words, at least a to-be-split pattern 204b is defined among the line patterns 202 of the first original layout 200 according to the preferred embodiment, and more particularly, the to-be-split pattern 204b is overlapped with a connection pattern 212a. Furthermore, the to-be-split pattern 204b is split to form a cutting portion 206a and a counterpart cutting portion 206b at where the to-be-split pattern 204b overlapped with the connection pattern 212a simultaneously with splitting the to-be-split pattern 204a according to the preferred embodiment.

Figure 6:
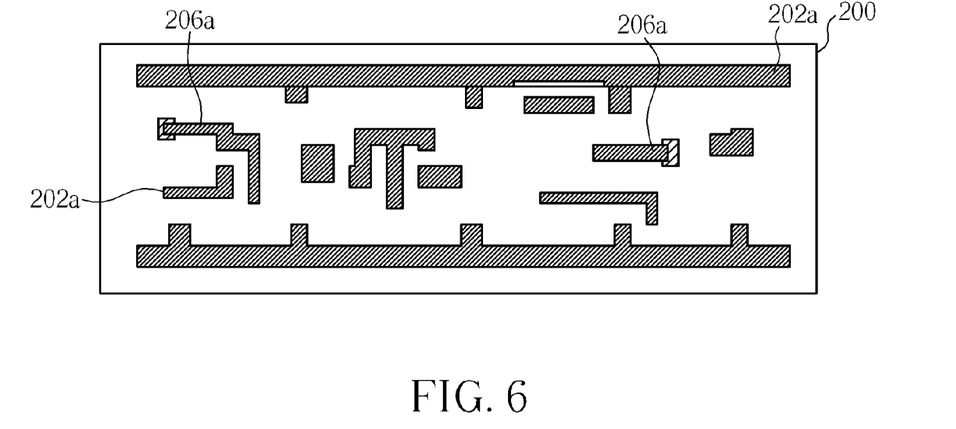
Figure 7:
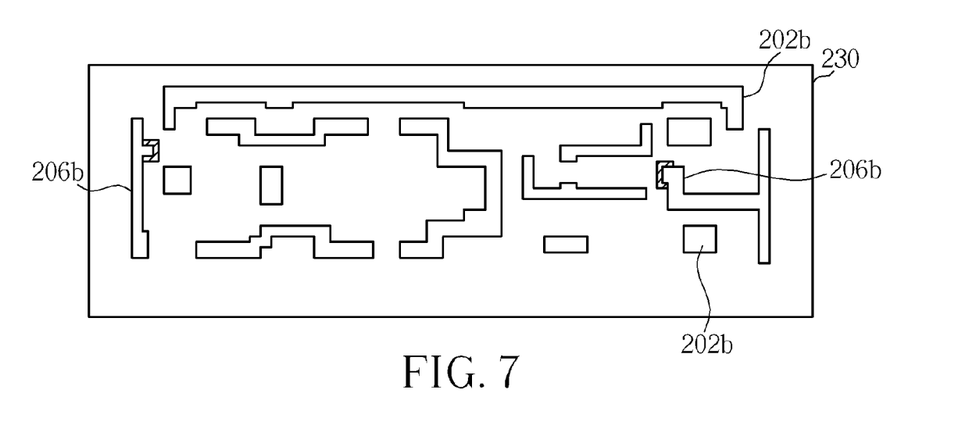

Please refer to FIG. 6 and FIG. 7. Next, the first original layout 200 is decomposed and the to-be-split pattern 204a and the to-be-split pattern 204b are split. During decomposing the first original layout 200, the first line patterns 202a, the cutting portion 206a of the to-be-split pattern 204a, and the cutting portion 206a of the to-be-split pattern 204b are formed as a first decomposed layout 220. Simultaneously, the second line patterns 202b, the counterpart cutting portion 206b of the to-be-split pattern 204a, and the counterpart cutting portion 206b of the to-be-split pattern 204b are formed as a second decomposed layout 230. It is noteworthy that in the first decomposed layout 220, a spacing width between the first line pattern 202a, the cutting portion 206a of the to-be-split pattern 204a, and the cutting portion 206a of the to-be-split pattern 204b always fulfills the abovementioned predetermined rule. In the same concept, in the second decomposed layout 230, a spacing width between the second line pattern 202b, the counterpart cutting portion 206b of the to-be-split pattern 204a, and the counterpart cutting portion 206b of the to-be-split pattern 204b always fulfills the abovementioned predetermined rule. In addition, after forming the first decomposed layout 220 and the second decomposed layout 230, an optical proximity correction (OPC) is performed to the first decomposed layout 220 and the second decomposed layout 230, respectively.

It is noteworthy that according to the preferred embodiment, a correction is performed after forming the first decomposed layout 220 and the second decomposed layout 230. The correction is performed to each cutting portion 206*a* of the first decomposed layout 220 and each counterpart cutting portion 206*b* of the second decomposed layout 230. In detail, the correction is performed to extend the cutting portions 206*a* of the first decomposed layout 220 along a direction toward its corresponding counterpart cutting portions 206*b*. Also, the correction is performed to extend the counterpart cutting portions 206*b* of the second decomposed layout 230 along a direction toward the cutting portion 206*a*. Accordingly stitch patterns are obtained. By performing the correction, the overlap region of the cutting portion 206*a* and its corresponding counterpart cutting portion 206*b* is enlarged, and thus line broken between the cutting portions 206*a* and the counterpart cutting portions 206*b* due to overlay error or line-end shortening are mitigated.

Figure 8:
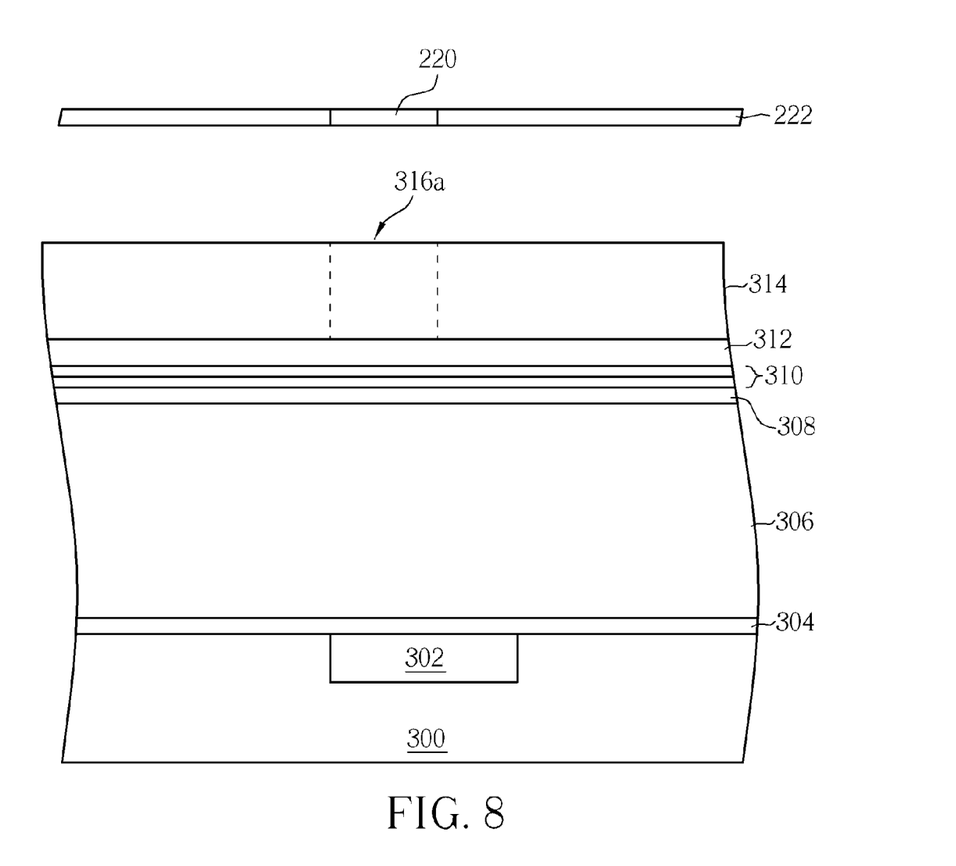
Figure 9:
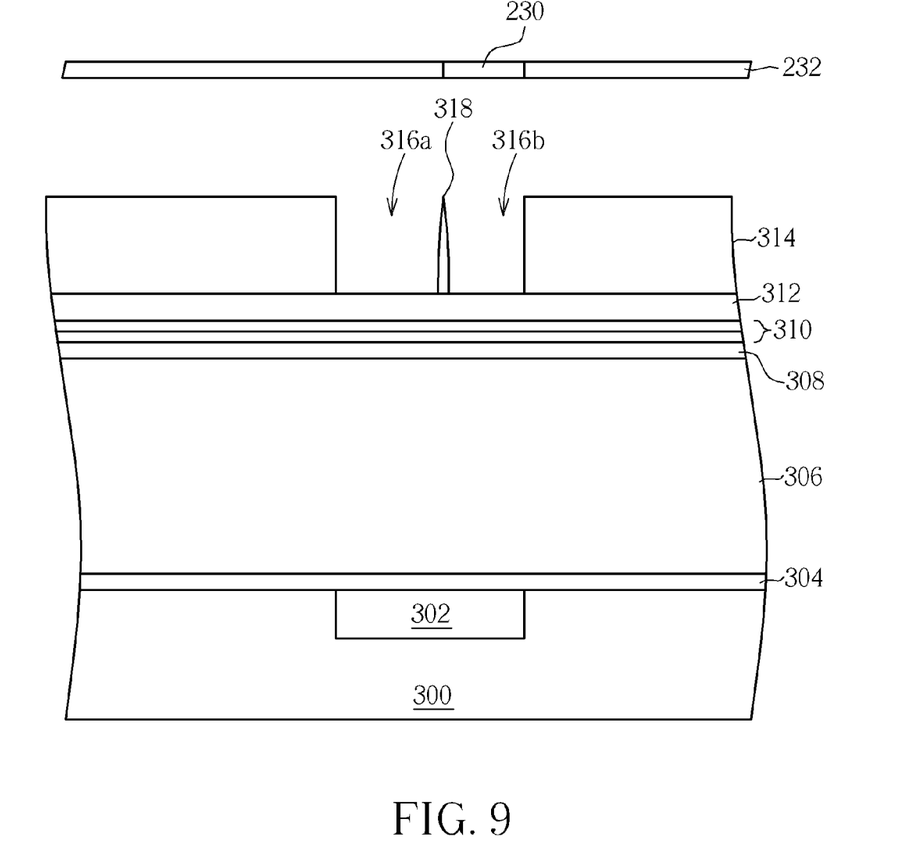

Please refer to FIG. 8 and FIG. 9. Then, the first decomposed layout 220 is outputted and formed on a first mask 222 (shown in FIG. 8), and the second decomposed layout 230 is simultaneously outputted and formed on a second mask 232 (shown in FIG. 9). Next, a double patterning technique is performed to a predetermined layer with the first mask 222 and the second mask 232. According to the preferred embodiment, a substrate 300 having a conductive layer 302 formed therein is provided. A base layer 304 covering the conductive layer 302 is formed on the substrate 300. In the preferred embodiment, the base layer 304 can include silicon carbon nitride (SiCN), but not limited to this. A dielectric layer 306 is formed on the base layer 304. In the preferred embodiment, the dielectric layer 306 can include ultra low dielectric constant (low-K, ULK) material, but not limited to this. On the dielectric layer 306, a cap layer 308, a multi-layered metal hard mask 310, a bottom anti-reflective coating (BARC) 312, and a photoresist layer 314 are sequentially formed.

Please still refer to FIG. 8. Next, a double patterning technique is performed with the first mask 222 and the second mask 232. First, the first decomposed layout 220 on the first mask 222 is transferred to the photoresist layer 314 to form at least a first opening 316*a*. It is noticeable that because the DPT used in the preferred embodiment is applied with two exposure steps and one development step (2P1D), the first opening 316*a* is formed in the photoresist layer 314 as depicted by the dashed line shown in FIG. 8. Please refer to FIG. 9. Next, the second decomposed layout 230 on the second mask 232 is transferred to the photoresist layer 314 to form at least a second opening 316*b*. It is noteworthy that the first opening 316*a* and the second opening 316*b* are corresponding to the cutting portion 206*a* and the counterpart cutting portion 206*b* of the to-be-split pattern 204*a*/204*b*. Therefore, when overlay error or line-end shortening under defocus occurs, the first opening 316*a* and the second opening 316*b* may not be connected to each other as shown in FIG. 9. Accordingly, a residue 318 including the photoresist 314, the BARC 312, the metal hard mask 310, and the cap layer 308 is formed between the first opening 316*a* and the second opening 316*b*. Additionally, those skilled in the art would easily realize that the preferred embodiment can also be applied with two exposure steps and two development steps (2P2D) for transferring the first decomposed layout 220 on the first mask 222 and the second decomposed layout 230 on the second mask 232 to the photoresist layer 314.

Figure 10:
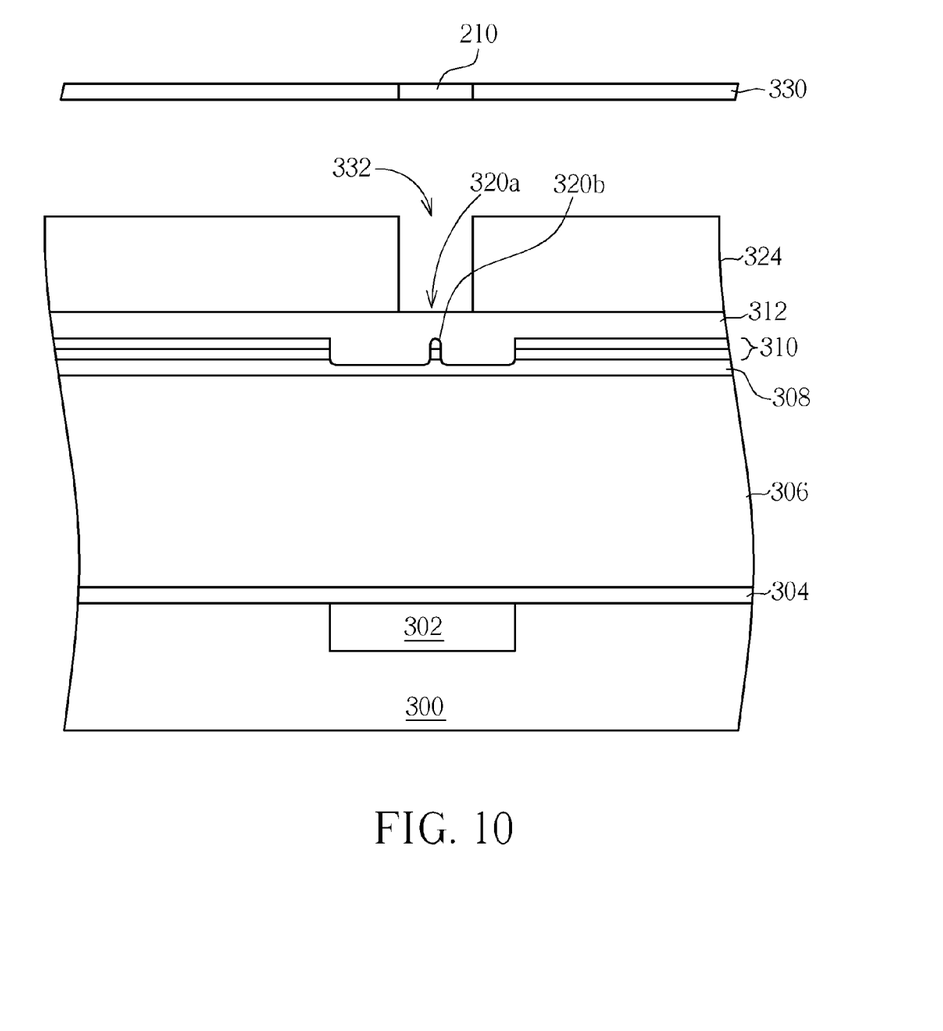

Please refer to FIG. 10. Then, an etching process of the DPT is performed to transfer the first opening 316*a* and the second opening 316*b*, that are the first decomposed layout 220 and the second decomposed layout 230, to the multi-layered metal hard mask 310 and the cap layer 308. Consequently, a trench opening 320*a* is obtained. Subsequently, the photoresist layer 314 and the BARC 312 are removed. It is well-known to those skilled in the art that after performing the DPT, the multi-layered metal hard mask 310 and the cap layer 308 include the line patterns 202 and the to-be-split patterns 204*a*/204*b* of the first original layout 200 formed therein. It is noteworthy that since the residue 318 is remained between the first opening 316*a* and the second opening 316*b*, a residue 320*b* including the multi-layered metal hard mask 310 and the cap layer 308 is formed in the trench opening 320*a* because the residue 318 obstructs the etching process. In addition, though the double patterning technique adopts the litho-litho-etch (LLE) 2P1E approach with one or double at photoresist layer in the preferred embodiment, the DPT can adopt litho-etch-litho-etch (LELE) 2P2E approach with two photoresist layers. When the DPT adopts the 2P2E approach, the two etching steps make the defect of residue remaining more serious due to line-end shortening problem.

Please still refer to FIG. 10. Next, another BARC 322 and a photoresist layer 324 are formed on the metal hard mask 310, the trench opening 320, and the residue 320*b*. And a patterning process is performed with a third mask 330 having the abovementioned second original layout 210 to transfer the connection patterns 212*a* of the second original layout 210 to the photoresist layer 324. Consequently, at least a third opening 332 is obtained. The third opening 332 can be a contact opening or a via opening. In addition, the patterning process for transferring the second original layout 210 can be performed before or after the abovementioned DPT.

Figure 11:
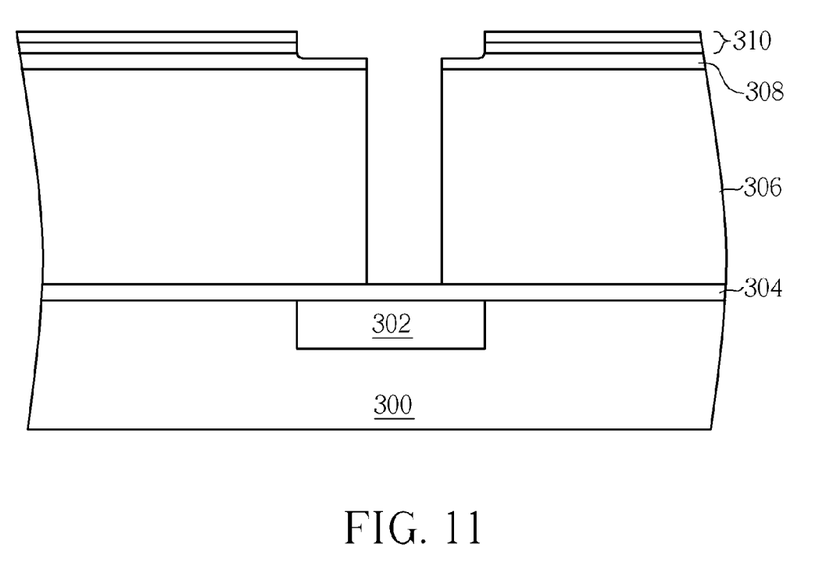

Please refer to FIG. 11. Then, an etching process is performed to etch the BARC 322, the metal hard mask 310, the cap layer 308, and the dielectric layer 306 through the third opening 332 in the photoresist layer 324 to expose the base layer 304. Subsequently, the photoresist layer 324 and the BARC 322 are removed. In other words, the second original layout 210 is transferred to the dielectric layer 306. Additionally, according to a modification to the preferred embodiment, the second original layout 210 can be transferred by another DPT.

It is noteworthy that since the to-be-split pattern 204*b* is defined at where a line pattern is overlapped with a connection pattern 212*a* when defining the first decomposed layout 220 and the second decomposed layout 230, and the to-be-split pattern 204*b* is split to form the cutting portion 206*a* and the counterpart cutting portion 206*b* at where the to-be-split pattern 204*b* overlapped with the connection pattern 212*a* when decomposing the first decomposed layout 220 and the second decomposed layout 230, the residue 320*b* is often remained at where the cutting portion 206*a* and the counterpart cutting portion 206*b* are adjoined when transferring the to-be-split pattern 204*b* to the metal hard mask 310 and the cap layer 308 due to overlay error or line-end shortening. However, the residue 320*b* is removed when transferring the connection patterns 212*a* to the dielectric layer 306 since the connection patterns 212*a* is corresponding to and overlapped with the cutting portion 206*a* and the counterpart cutting portion 206*b*. In other words, the cutting portion 206*a* and the counterpart cutting portion 206*b* are connected to be a complete configuration after forming the connection patterns 212*a* and the incomplete etching or line broken problem due to the residue 320*b* is eliminated.

According to the method for fabricating a semiconductor layout provided by the first preferred embodiment, at least a line pattern 202 overlapped with the connection pattern 212*a* of the second original layout 210 is defined as the to-be-split pattern 204*b*. In other words, the to-be-split pattern 204*b* of the first original layout 200 always has a corresponding connection pattern 212*a*. Therefore, when the first original layout 200 is decomposed to the first decomposed layout 220 and the second decomposed layout 230, and transferred to the object layer by the DPT, a connection pattern 212a is always subsequently formed on the to-be-split pattern 204b particularly at where the to-be-split pattern 204b is split (where the cutting portion 206a and the counterpart cutting portion 206b are adjoined). Consequently, line broken occurred at the cutting portion 206a and the counterpart cutting portion 206b due to overlay error or line-end shortening in the DPT is eliminated by forming the corresponding connection pattern 212a.

Please refer to FIG. 3 and FIGS. 6-12, which are schematic drawings illustrating a method for fabricating a semiconductor layout provided by a second preferred embodiment of the present invention. It is noteworthy that elements the same in both first and second preferred embodiments are designated by the same numerals and the steps the same in both first and second preferred embodiments are omitted in the interest of brevity.

As shown in FIG. 3, a first original layout 200 is provided. In the preferred embodiment, the first original layout 200 includes a trench layout of metal interconnections. The first original layout 200 includes a plurality of line patterns 202 such as trench patterns, but not limited to this. The line patterns 202 in the preferred embodiment can also include the polysilicon line patterns. As mentioned above, when a spacing width between a line pattern 202 and its adjacent at least two line patterns 202 violates a predetermined rule, such as a minimum design rule, the three line patterns 202 are designated to be decomposed to two different masks. However, if the violation is still not eliminated even the three line patterns 202 are decomposed to two masks, the preferred embodiment is to specifically define one of those line patterns 202 as a to-be-split pattern 204a among the line patterns 202 in the first original layout 200 according to the preferred embodiment. In other words, at least a to-be-split pattern 204a is defined among the line patterns 202 of the first original layout 200, and a spacing width between the to-be-split pattern 204a and other line patterns 202 violates the abovementioned predetermined rule.

Figure 12:
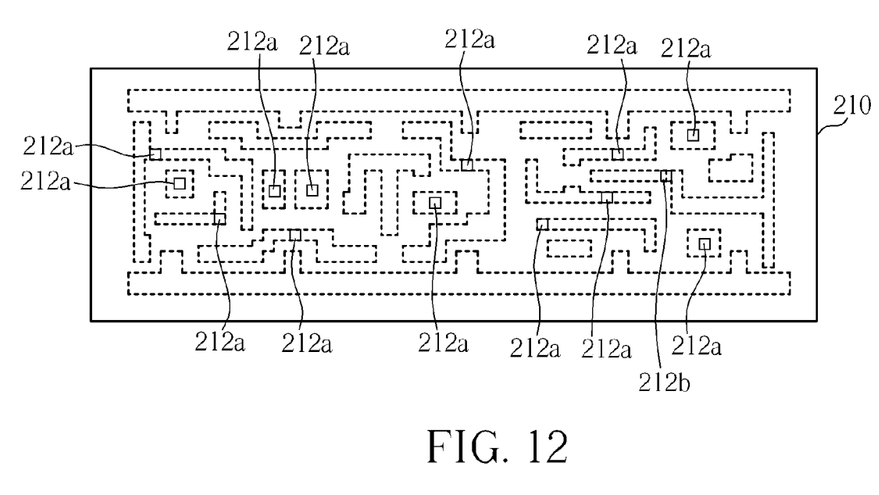

Please refer to FIG. 12. Next, a second original layout 210 is provided. The second original layout 210 includes a plurality of connection patterns 212a. According to the preferred embodiment, the second original layout 210 can be a via layout of metal interconnections, a dummy via layout, or a contact layout, but not limited to this. The second original layout 210 is to be transferred to a layer stacked on or under a layer to which the first original layout 200 is transferred. It is noteworthy that the first original layout 200 is shown by the dashed lines in FIG. 12 for emphasizing the spatial relationship between the first original layout 200 and the second original layout 210. However, those skilled in the art would easily realize that the second original layout 210 includes only the connection patterns 212a that are shown by the solid lines.

Please refer to FIGS. 5-12. Next, the first original layout 200 and the second original layout 210 are compared and the first original layout 200 is simultaneously decomposed. In detail, when spacing widths between two adjacent the line patterns 202 of the first original layout 200 violate the abovementioned predetermined rule, the adjacent line patterns 202 are respectively defined to be a plurality of first line patterns 202a and a plurality of second line patterns 202b such that the spacing widths between each first line patterns 202a fulfill the predetermined rule and the spacing widths between each second line patterns 202b fulfill the predetermined rule, too. Since the preferred embodiment adopts the DPT, the first line patterns 202a and the second patterns 202b are to be formed on different masks: One of the masks includes the first line patterns 202a, and the other includes the second line patterns 202b. More important, the to-be-split pattern 204a is split to form a cutting portion 206a and a counterpart cutting portion 206b. The cutting portion 206a and the first line patterns 202a are formed in the same mask while the counterpart cutting portion 206b and the second line patterns 202b are formed in the same mask.

It is noteworthy that after defining the cutting portion 206a and the counterpart cutting portion 206b from the to-be-split pattern 204a, the preferred embodiment further provides a connection pattern 212b overlapping with the to-be-split pattern 204a, particularly at where the cutting portion 206a and the counterpart cutting portion 206b are adjoined. According to the preferred embodiment, the connection pattern 212b is inserted into the second original layout 210. However, the preferred embodiment can further provide a third original layout (not shown) having only the connection patterns 212b. Furthermore, the preferred embodiment is preferably to define at least a to-be-split pattern 204b among the line patterns 202 when a line pattern 202 is overlapped with a connection pattern 212a of the second original layout 210.

Please refer to FIG. 6 and FIG. 7 again. Next, the first original layout 200 is decomposed and the to-be-split pattern 204a and the to-be-split pattern 204b are split. During decomposing the first original layout 200, the first line patterns 202a, the cutting portion 206a of the to-be-split pattern 204a, and the cutting portion 206a of the to-be-split pattern 204b are formed as a first decomposed layout 220. Simultaneously, the second line patterns 202b, the counterpart cutting portion 206b of the to-be-split pattern 204a, and the counterpart cutting portion 206b of the to-be-split pattern 204b are formed as a second decomposed layout 230. It is noteworthy that in the first decomposed layout 220, a spacing width between the first line pattern 202a, the cutting portion 206a of the to-be-split pattern 204a, and the cutting portion 206a of the to-be-split pattern 204b always fulfills the abovementioned predetermined rule. In the same concept, in the second decomposed layout 230, a spacing width between the second line pattern 202b, the counterpart cutting portion 206b of the to-be-split pattern 204a, and the counterpart cutting portion 206b of the to-be-split pattern 204b always fulfills the abovementioned predetermined rule. In addition, after forming the first decomposed layout 220 and the second decomposed layout 230, an OPC is performed to the first decomposed layout 220 and the second decomposed layout 230, respectively.

According to the preferred embodiment, a correction is performed after forming the first decomposed layout 220 and the second decomposed layout 230. The correction is performed to each cutting portion 206a of the first decomposed layout 220 and each counterpart cutting portion 206b of the second decomposed layout 230. In detail, the correction is performed to extend the cutting portions 206a of the first decomposed layout 220 along a direction toward its corresponding counterpart cutting portions 206b. Also, the correction is performed to extend the counterpart cutting portions 206b of the second decomposed layout 230 along a direction toward its corresponding cutting portion 206a. Accordingly stitch patterns are obtained. By performing the correction, the overlap region of the cutting portion 206a and its corresponding counterpart cutting portion 206b is enlarged, and thus line broken between the cutting portions 206a and the counterpart cutting portions 206b due to overlay error or line-end shortening are mitigated.

Please refer to FIGS. 8-10. Then, the first decomposed layout 220 is outputted and formed on a first mask 222 (shown in FIG. 8), and the second decomposed layout 230 is simultaneously outputted and formed on a second mask 232 (shown in FIG. 9). Next, a double patterning technique is performed to a predetermined layer with the first mask 222 and the second mask 232. For example, as shown in FIG. 8 and FIG. 9, the first decomposed layout 220 on the first mask 222 and the second decomposed layout 230 on the second mask 232 are respectively transferred to a photoresist layer 314 to form at least a first opening 316a and a second opening 316b. As mentioned above, a residue 318 is formed between the first opening 316a and the second opening 316b as shown in FIG. 9 when overlay error or line-end shortening under defocus occurs. And the residue 318 is transferred to the multi-layered metal hard mask 310 and the cap layer 308 to form a residue 320b as shown in FIG. 10 after performing an etching process of the DPT as mentioned above.

Please refer to FIG. 10 and FIG. 11. Next, another BARC 322 and a photoresist layer 324 are formed and followed by performing a patterning process with a third mask 330 having the abovementioned second original layout 210 to transfer the connection patterns 212a of the second original layout 210 to the photoresist layer 324. Consequently, at least a third opening 332 is obtained.

It is noteworthy that the connection pattern 212b is provided to overlap the to-be-split pattern 204a, particularly at where the cutting portion 206a and the counterpart cutting portion 206b are adjoined when forming the second original layout 210, therefore the residue 320b remained at where the cutting portion 206a and the counterpart cutting portion 206b are adjoined when transferring the cutting portion 206a and the counterpart cutting portion 206b to the metal hard mask 310 and the cap layer 308 due to overlay error or line-end shortening is removed by transferring the connection pattern 212b overlapped with the to-be-split pattern 204a. In other words, the cutting portion 206a and the counterpart cutting portion 206b are connected to be a complete configuration after forming the connection pattern 212b and the incomplete etching or line broken problem due to the residue 320b is eliminated.

According to the method for fabricating a semiconductor layout provided by the second preferred embodiment, the connection pattern 212b is provided and overlapped with the to-be-split pattern 204a of the first original layout 200, particularly at where the cutting portion 206a and the counterpart cutting portion 206b are adjoined. The connection pattern 212b can be inserted in the second original layout 210 or be formed on a third original layout. Accordingly, the to-be-split pattern 204a of the first original layout 200 always has a corresponding connection pattern 212b. Therefore, when the first original layout 200 is decomposed to the first decomposed layout 220 and the second decomposed layout 230, and transferred to the object layer by the DPT, a connection pattern 212b is always formed on the to-be-split pattern 204a particularly at where the to-be-split pattern 204a is split (where the cutting portion 206a and the counterpart cutting portion 206b are adjoined). Consequently, line broken occurred at the cutting portion 206a and the counterpart cutting portion 206b due to overlay error or line-end shortening in the DPT is eliminated by forming the corresponding connection pattern 212b.

Figure 13:
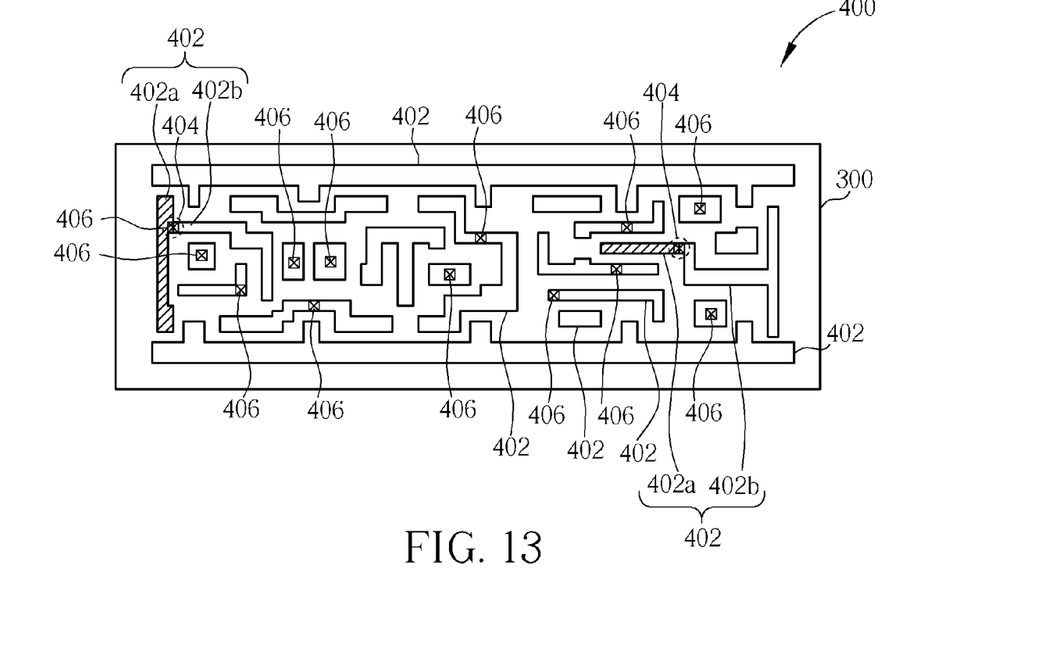
FIG. 13 and FIG. 14 are schematic drawings illustrating a semiconductor structure formed according to the method provided by the first and/or second preferred embodiment.
Figure 14:
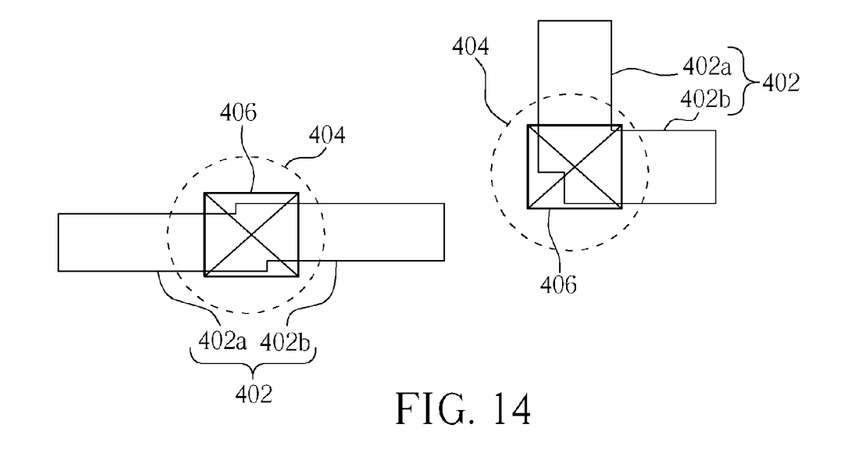

Please refer to FIG. 13 and FIG. 14, which are schematic drawings illustrating a semiconductor structure formed according to the method provided by the first and/or second preferred embodiment. As shown in FIG. 13, a semiconductor structure 400 is formed on the substrate 300. The semiconductor structure 400 includes a plurality of line patterns 402 formed by transferring the first decomposed layout 220 and second decomposed layout 230 with the DPT. Therefore, the line patterns 402 are corresponding to the line patterns 202 of the first original layout 200. The line patterns 402 can include trench patterns of metal interconnections, but not limited to this. It is noteworthy that the line pattern 402 can be an intact configuration or a pattern composed of different configurations. Therefore a portion of the line patterns 402 of the semiconductor structure 400 include at least a first line 402a and a second line 402b. The first line 402a and the second line 402b are respectively corresponding to the cutting portion 206a and the counterpart cutting portion 206b of the to-be-split pattern 204a/204b in the first original layout 200. The first line 402a and the second line 402b are connected to or adjoined to each other in a connection region 404 (depicted by circle 404). Additionally, since the line patterns 402 composing of the first line 402a and the second line 402b are formed by transferring the first original layout 200, the first line 402a and the second line 402b are co-planar.

Furthermore, the first line 402a and the second line 402b can be arranged in an aligned fashion as shown in FIG. 13 and arranged to form a flat shape, a T shape or an L shape. However, the first line 402a and the second line 402b can also be arranged in a misaligned fashion as shown in FIG. 14 and arranged to form an L shape.

Please still refer to FIG. 13. According to the method of first and/or second preferred embodiment of the present invention, the provided semiconductor structure 400 further includes a connection pattern 406 positioned in the connection region 404 for electrically connecting the first line 402a and the second line 402b. It is noticeable that the connection pattern 406 is positioned in a layer under or on the layer in which the first line 402a, the second line 402b, or other line patterns are formed. In other words, the connection patterns 406 are non-coplanar with the first lines 402a and the second lines 402b. As mentioned above, since the connection patterns 406 are formed by transferring the second original layout 210 to the layer on the substrate 300, the connection patterns 406 are corresponding to the connection patterns 212a/212b of the second original layout 210. The connection patterns 406 include via patterns of metal interconnections, dummy via patterns or contact patterns, but not limited to this.

According to the semiconductor structure 400 formed by the method provided by the first and/or second preferred embodiment, the line pattern 402 formed by the first line 402a and the second line 402b always has a corresponding connection pattern 406 formed on or under the first line 402a and the second line 402b for providing electrical connection. Therefore after forming the first line 402a and the second line 402b, that is after performing the DPT, the line broken issue caused by overlay error or line-end shortening is eliminated by forming the connection patterns 406. And thus the reliability of the obtained semiconductor structure 400 is improved by the present invention.

According to the method for fabricating a semiconductor layout provided by the present invention, the first original layout having the line patterns and the second original layout the connection patterns are provided. Then, the line patterns overlapped with the connection patterns are defined as the to-be-split patterns. Or, another connection patterns corresponding to the to-be-split patterns are provided in the second original layout or other layout. Accordingly, any to-be-split pattern of the first original layout obtains a corresponding connection pattern. Therefore, after decomposing the first original layout into the first decomposed layout and the second decomposed layout and transferring the first decomposed layout and the second decomposed layout into a layer by the DPT, a connection pattern is always subsequently formed correspondingly to the to-be-split pattern, particularly at where the to-be-split pattern is split. Consequently, line broken issue is eliminated by forming the connection patterns corresponding to the to-be-split patterns even overlay error or line-end shortening defect occur and thus reliability of the formed semiconductor structure is improved. Briefly speaking, the present invention provides a method for fabricating a semiconductor layout that is able to solve the line broken problem in the DPT without increasing process complexity.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for fabricating a semiconductor layout comprising:
   providing a first layout comprising a plurality of line patterns;
   providing a second layout comprising a plurality of connection patterns;
   defining at least a first to-be-split pattern among the line patterns of the first layout, the first to-be-split pattern being overlapped with the connection pattern; and
   splitting the first to-be-split pattern at where the first to-be-split pattern overlapped with the connection pattern to decompose the first layout into a third layout and a fourth layout; and
   outputting the third layout and the fourth layout to a first finished mask and a second finished mask respectively; and
   fabricating the semiconductor layout using the outputted masks.

2. The method for fabricating a semiconductor layout according to claim 1, further comprising defining at least a second to-be-split pattern among the first line patterns of the first layout, a spacing width between the second to-be-split pattern and the adjacent line patterns violates a predetermined rule.

3. The method for fabricating a semiconductor layout according to claim 2, further comprising splitting the second to-be-split pattern simultaneously with splitting the first to-be-split pattern to decompose the first layout into the third layout and the fourth layout.

4. The method for fabricating a semiconductor layout according to claim 3, wherein the third layout and the fourth layout respectively comprise a portion of the line patterns and a portion of the second to-be-split pattern, and a spacing width between the line patterns and the second to-be-split pattern fulfills the predetermined rule.

5. The method for fabricating a semiconductor layout according to claim 1, wherein the first to-be-split pattern is split into a cutting portion and a counterpart cutting portion, and the third layout comprises the cutting portion and the fourth layout comprises the counterpart cutting portion.

6. The method for fabricating a semiconductor layout according to claim 5, further comprising performing a correction to the third layout and the fourth layout to extend the cutting portion of the third layout along a direction toward the counterpart cutting portion and to extend the counterpart cutting portion of the fourth layout along a direction toward the cutting portion after forming the third layout and the fourth layout.

7. The method for fabricating a semiconductor layout according to claim 1, further comprising performing an optical proximity correction (OPC) to the third layout and the fourth layout after forming the third layout and the fourth layout.

8. The method for fabricating a semiconductor layout according to claim 1, wherein the first layout comprises a trench layout of metal interconnections.

9. The method for fabricating a semiconductor layout according to claim 1, wherein the second layout comprises a via layout of metal interconnections, a dummy via layout, or a contact layout.

10. A method for fabricating a semiconductor layout comprising:
    providing a first layout comprising a plurality of line patterns;
    defining a plurality of to-be-split patterns among the line patterns;
    providing a second layout comprising a plurality of first connection patterns;
    inserting a plurality of second connection patterns respectively overlapping with the to-be-split patterns into the second layout;
    outputting the second layout to a finished mask; and
    fabricating the semiconductor layout using the outputted mask.

11. The method for fabricating a semiconductor layout according to claim 10, wherein a spacing width between the to-be-split patterns and the line patterns violates a predetermined rule.

12. The method for fabricating a semiconductor layout according to claim 11, further comprising splitting the to-be-split pattern to form a third layout and a fourth layout.

13. The method for fabricating a semiconductor layout according to claim 12, wherein the third layout and the fourth layout respectively comprise a portion of the line patterns, and a spacing width between the line patterns fulfill the predetermined rule.

14. The method for fabricating a semiconductor layout according to claim 12, wherein the to-be-split pattern are split to a cutting portion and a counterpart cutting portion, and the third layout comprises the cutting portion and the fourth layout comprises the counterpart cutting portion.

15. The method for fabricating a semiconductor layout according to claim 14, further comprising performing a correction to the third layout and the fourth layout to extend the cutting portion of the third layout along a direction toward the counterpart cutting portion and to extend the counterpart cutting portion of the fourth layout along a direction toward the cutting portion after forming the third layout and the fourth layout.

16. The method for fabricating a semiconductor layout according to claim 15, wherein the correction is performed after forming the third layout and the fourth layout or after forming the second connection patterns.

17. The method for fabricating a semiconductor layout according to claim 15, further comprising performing an OPC to the third layout and the fourth layout.

18. The method for fabricating a semiconductor layout according to claim 17, wherein the OPC is performed after forming the third layout and the fourth layout or after forming the second connection patterns.

19. The method for fabricating a semiconductor layout according to claim 10, wherein the line patterns of the first layout comprise trench patterns of metal interconnections.

20. The method for fabricating a semiconductor layout according to claim 10, wherein the first connection patterns of the second layout comprise via patterns of metal interconnections or contact patterns.

21. The method for fabricating a semiconductor layout according to claim 10, wherein the second connection patterns comprise via patterns of metal interconnections, dummy via patterns, or contact patterns.

22. A method for fabricating a semiconductor layout comprising:
provide a first original layout and a second original layout, the first original layout comprising a plurality of line patterns and the second original layout comprising a plurality of connection patterns;
defining a plurality of to-be-split patterns in the first original layout, the to-be-split patterns being overlapped with the connection patterns;
decomposing the first original layout to a first decomposed layout and a second decomposed layout, the first decomposed layout and the second decomposed layout respective having a portion of the line patterns and a portion of the to-be-split patterns;
forming the first decomposed layout and the second decomposed layout on a first finished mask and a second finished mask respectively;
performing a double patterning technique to sequentially transfer the first decomposed layout and the second decomposed layout to a layer to form the line patterns and the to-be-split patterns in the layer using the outputted masks.

23. The method for fabricating a semiconductor layout according to claim 22, further comprising transferring the connection patterns of the second original layout into the layer.

24. The method for fabricating a semiconductor layout according to claim 23, wherein the second original layout is transferred before or after the double patterning technique.

25. The method for fabricating a semiconductor layout according to claim 22, wherein a spacing width between the to-be-split patterns and the line patterns of the first original layout violates a predetermined rule.

26. The method for fabricating a semiconductor layout according to claim 25, wherein a spacing width between the line patterns and a portion of the to-be-split patterns of the first decomposed layout fulfills the predetermined rule and a spacing width between the line patterns and a portion of the to-be-split patterns of the second decomposed layout fulfills the predetermined rule.

27. The method for fabricating a semiconductor layout according to claim 22, wherein the to-be-split pattern is split to a cutting portion and a counterpart cutting portion, and the first decomposed layout comprises the cutting portions and the second decomposed layout comprises the counterpart cutting portions.

28. The method for fabricating a semiconductor layout according to claim 27, wherein the to-be-split pattern is split into the cutting portion and the counterpart cutting portion at where the to-be-split pattern and the connection pattern are overlapped.

29. The method for fabricating a semiconductor layout according to claim 27, further comprising performing a correction to the first decomposed layout and the second decomposed layout to extend the cutting portions of the first decomposed layout along a direction toward the counterpart cutting portions and to extend the counterpart cutting portions of the second decomposed layout along a direction toward the cutting portions after forming the first decomposed layout and the second decomposed layout.

30. The method for fabricating a semiconductor layout according to claim 22, wherein the line patterns of the first original layout comprise trench patterns of metal interconnections.

31. The method for fabricating a semiconductor layout according to claim 22, wherein the connection patterns of the second original layout comprise via patterns of metal interconnections, dummy via patterns, or contact patterns.

* * * * *